United States Patent
Gurevich et al.

(10) Patent No.: US 9,519,714 B2
(45) Date of Patent: Dec. 13, 2016

(54) PRESENTING LIST PREVIEWS AMONG SEARCH RESULTS

(75) Inventors: Olga Iosifovna Gurevich, San Francisco, CA (US); Valerie Rose Nygaard, San Francisco, CA (US); William Alan Fitzgerald, Kalamazoo, MI (US); Jingwen Lu, San Jose, CA (US); Toby Takeo Sterrett, San Francisco, CA (US); Ian Collins, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 12/976,422

(22) Filed: Dec. 22, 2010

(65) Prior Publication Data

US 2012/0166973 A1    Jun. 28, 2012

(51) Int. Cl.
*G06F 3/048* (2013.01)
*G06F 17/30* (2006.01)

(52) U.S. Cl.
CPC ... *G06F 17/30864* (2013.01); *G06F 17/30991* (2013.01)

(58) Field of Classification Search
CPC ............ G06F 17/3089; G06F 17/30873; G06F 17/30905; G06F 9/4443; G06F 17/30899
USPC ........................................ 715/760
See application file for complete search history.

(56) References Cited

U.S. PATENT DOCUMENTS

| | | | |
|---|---|---|---|
| 5,542,090 A * | 7/1996 | Henderson et al. | |
| 5,987,457 A * | 11/1999 | Ballard | |
| 6,609,123 B1 * | 8/2003 | Cazemier et al. | |
| 6,961,723 B2 * | 11/2005 | Faybishenko et al. | |
| 6,978,264 B2 * | 12/2005 | Chandrasekar et al. | |
| 7,031,968 B2 * | 4/2006 | Kremer ............ | G06F 17/30864 707/706 |
| 7,124,148 B2 * | 10/2006 | Sauermann ....... | G06F 17/30554 707/740 |
| 7,302,426 B2 * | 11/2007 | Bier | |
| 7,409,635 B2 * | 8/2008 | Epstein ......................... | 715/243 |
| 7,529,731 B2 * | 5/2009 | Bier | |
| 7,539,670 B2 * | 5/2009 | Ohtomo | |
| 7,664,734 B2 * | 2/2010 | Lawrence et al. ............. | 707/767 |
| 7,747,601 B2 * | 6/2010 | Cooper et al. ................. | 707/708 |
| 7,752,237 B2 * | 7/2010 | Ray ............................... | 707/805 |
| 7,769,746 B2 * | 8/2010 | Lu et al. ........................ | 707/713 |
| 7,788,252 B2 * | 8/2010 | Delli Santi et al. .......... | 707/708 |
| 7,788,326 B2 * | 8/2010 | Buchheit et al. ............. | 709/206 |

(Continued)

OTHER PUBLICATIONS

"Results Snippets," Published Apr. 7, 2009, http://nlp.stanford.edu/IR-book/html/htmledition/results-snippets-1.html, 3 pp.

(Continued)

*Primary Examiner* — Jung-Mu Chuang
(74) *Attorney, Agent, or Firm* — Jessica Meyers; Tom Wong; Micky Minhas (57) ABSTRACT

Systems, methods, and computer storage media having computer-executable instructions embodied thereon that facilitates the presentation of list previews among search results are provided. Upon referencing a user query that indicates a user intent to view a list, a search result within a search results page is presented that includes a list preview. Such a list preview includes at least a portion of a list within a webpage that corresponds with the search results.

16 Claims, 6 Drawing Sheets

(56) References Cited

U.S. PATENT DOCUMENTS

| | | | | |
|---|---|---|---|---|
| 7,856,432 | B2* | 12/2010 | Tesch et al. | 707/722 |
| 7,933,886 | B2* | 4/2011 | Dietz et al. | 707/706 |
| 7,958,109 | B2* | 6/2011 | Lin et al. | 707/706 |
| 7,974,976 | B2* | 7/2011 | Yahia et al. | 707/736 |
| 8,078,630 | B2* | 12/2011 | Dexter et al. | 707/758 |
| 8,095,419 | B1* | 1/2012 | Kapur | 705/14.2 |
| 8,108,371 | B2* | 1/2012 | Dharmarajan et al. | 707/705 |
| 8,135,721 | B2* | 3/2012 | Joshi et al. | 707/750 |
| 8,171,021 | B2* | 5/2012 | Guha et al. | 707/723 |
| 8,190,627 | B2* | 5/2012 | Platt et al. | 707/767 |
| 8,255,403 | B2* | 8/2012 | Kenedy et al. | 707/748 |
| 8,266,140 | B2* | 9/2012 | Bourges-Waldegg et al. | 707/722 |
| 8,275,760 | B2* | 9/2012 | Su | 707/707 |
| 8,290,967 | B2* | 10/2012 | Vailaya et al. | 707/755 |
| 8,296,296 | B2* | 10/2012 | Keith, Jr. | 707/731 |
| 8,321,425 | B2* | 11/2012 | Custis et al. | 707/748 |
| 8,332,399 | B1* | 12/2012 | Osinga | 707/730 |
| 8,341,017 | B2* | 12/2012 | Payne et al. | 705/14.43 |
| 8,341,157 | B2* | 12/2012 | Schulman | 707/737 |
| 8,346,792 | B1* | 1/2013 | Baker et al. | 707/759 |
| 8,375,027 | B2* | 2/2013 | Nakayama et al. | 707/736 |
| 8,375,048 | B1* | 2/2013 | Wad et al. | 707/767 |
| 8,380,723 | B2* | 2/2013 | Radlinski et al. | 707/748 |
| 8,386,477 | B1* | 2/2013 | Murphy et al. | 707/722 |
| 8,386,519 | B2* | 2/2013 | Kenedy et al. | 707/784 |
| 8,412,727 | B1* | 4/2013 | Das | G06F 17/3097 707/767 |
| 8,429,184 | B2* | 4/2013 | Ismalon | 707/765 |
| 8,478,780 | B2* | 7/2013 | Cooper et al. | 707/771 |
| 8,489,602 | B2* | 7/2013 | Nakayama et al. | 707/736 |
| 8,543,936 | B2* | 9/2013 | Neale et al. | 715/780 |
| 8,635,203 | B2* | 1/2014 | Chennavasin | 707/708 |
| 8,832,058 | B1* | 9/2014 | Bharat et al. | 707/706 |
| 2004/0249804 | A1* | 12/2004 | Nakayama | G06F 17/30011 |
| 2004/0261023 | A1* | 12/2004 | Bier | 715/530 |
| 2005/0080769 | A1* | 4/2005 | Gemmell | G06F 17/30991 |
| 2005/0154718 | A1* | 7/2005 | Payne | G06F 7/00 |
| 2005/0203878 | A1* | 9/2005 | Brill et al. | 707/3 |
| 2005/0222987 | A1* | 10/2005 | Vadon | G06F 17/30997 |
| 2005/0223067 | A1* | 10/2005 | Buchheit | G06Q 10/107 709/206 |
| 2005/0289103 | A1* | 12/2005 | Bier | G06F 17/3064 |
| 2006/0020576 | A1* | 1/2006 | Karube | 707/2 |
| 2006/0026128 | A1* | 2/2006 | Bier | G06F 17/30973 |
| 2006/0026152 | A1* | 2/2006 | Zeng et al. | 707/5 |
| 2006/0064411 | A1* | 3/2006 | Gross et al. | 707/3 |
| 2006/0136403 | A1* | 6/2006 | Koo | 707/3 |
| 2006/0294476 | A1* | 12/2006 | Buckley | G06F 17/30716 715/781 |
| 2007/0198506 | A1* | 8/2007 | Attaran Rezaei et al. | 707/5 |
| 2007/0220447 | A1* | 9/2007 | Ray | G06F 17/30893 715/822 |
| 2008/0016046 | A1* | 1/2008 | Guha | 707/3 |
| 2008/0071751 | A1* | 3/2008 | Keith | G06F 17/30327 |
| 2008/0120276 | A1* | 5/2008 | Chennavasin | 707/3 |
| 2008/0134093 | A1* | 6/2008 | Dharmarajan et al. | 715/838 |
| 2008/0140699 | A1* | 6/2008 | Jones et al. | 707/102 |
| 2008/0177717 | A1* | 7/2008 | Kumar et al. | 707/4 |
| 2008/0263023 | A1* | 10/2008 | Vailaya et al. | 707/5 |
| 2009/0006343 | A1* | 1/2009 | Platt et al. | 707/4 |
| 2009/0006577 | A1* | 1/2009 | Estrada | 709/217 |
| 2009/0077047 | A1* | 3/2009 | Cooper et al. | 707/4 |
| 2009/0150769 | A1* | 6/2009 | Konnola | G06F 17/30864 715/251 |
| 2009/0150792 | A1* | 6/2009 | Laakso et al. | 715/738 |
| 2009/0157669 | A1* | 6/2009 | Nakayama | G06F 17/30011 |
| 2009/0216736 | A1* | 8/2009 | Dexter et al. | 707/5 |
| 2009/0228439 | A1* | 9/2009 | Manolescu et al. | 707/3 |
| 2009/0241044 | A1* | 9/2009 | Costello | G06Q 30/02 715/764 |
| 2009/0307188 | A1* | 12/2009 | Oldham et al. | 707/3 |
| 2009/0313100 | A1* | 12/2009 | Ingleshwar | G06F 17/30864 705/14.25 |
| 2009/0319517 | A1* | 12/2009 | Guha et al. | 707/5 |
| 2010/0017392 | A1* | 1/2010 | Dian | 707/5 |
| 2010/0205180 | A1* | 8/2010 | Cooper et al. | 707/740 |
| 2010/0275236 | A1* | 10/2010 | Kortum et al. | 725/100 |
| 2010/0299317 | A1* | 11/2010 | Uy | 707/706 |
| 2011/0010386 | A1* | 1/2011 | Zeinfeld | 707/769 |
| 2011/0029541 | A1* | 2/2011 | Schulman | G06F 17/30864 707/748 |
| 2011/0035397 | A1* | 2/2011 | Joshi et al. | 707/759 |
| 2011/0035403 | A1* | 2/2011 | Ismalon | 707/769 |
| 2011/0066610 | A1* | 3/2011 | Choi | G06F 17/30899 707/722 |
| 2011/0082878 | A1* | 4/2011 | Nozaki | 707/769 |
| 2011/0173225 | A1* | 7/2011 | Stahl et al. | 707/769 |
| 2011/0211814 | A1* | 9/2011 | Sarukkai | 386/332 |
| 2011/0307482 | A1* | 12/2011 | Radlinski et al. | 707/731 |
| 2011/0320440 | A1* | 12/2011 | McDonald et al. | 707/723 |
| 2012/0150850 | A1* | 6/2012 | Parthasarathy et al. | 707/728 |
| 2012/0159379 | A1* | 6/2012 | Negrillo | G06F 3/0481 715/781 |
| 2013/0006977 | A1* | 1/2013 | Agrawal | G06F 17/30867 707/728 |
| 2013/0283179 | A1* | 10/2013 | Aaltonen et al. | 715/738 |
| 2014/0149399 | A1* | 5/2014 | Kurzion | 707/723 |
| 2014/0201204 | A1* | 7/2014 | Bharat et al. | 707/732 |
| 2014/0365499 | A1* | 12/2014 | Parikh et al. | 707/741 |

OTHER PUBLICATIONS

Yu Huang et al., "eXtract: A Snippet Generation System for XML Search," PVLDB '08, Aug. 23-28, 2008, Auckland, New Zealand, 4 pp.

"Google Search Now Supports Microformats and Adds 'Rich Snippets' to Search Results," Published May 12, 2009, http://www.google.com/support/webmasters/bin/answer.py?hl=en&answer=35264, 7 pp.

"Preview Web Page Search Results," retrieved Sep. 14, 2010, http://www.bjornenki.com/tools/search-results-preview, 2 pp.

* cited by examiner

PRESENTING LIST PREVIEWS AMONG SEARCH RESULTS

BACKGROUND

Search engines provide users with search results in response to user queries. Such search results generally include portions of webpages with keywords that match the user queries (i.e., snippets). In cases that a user is searching for a particular list, however, snippets including keyword matches to a user query may not provide the user with the desired information. As such, a user may be required to navigate away from a search results page to the website to view a list to obtain particular information and to determine relevancy of the list.

For instance, assume a user enters a query "list of art movements." In such a case, a snippet of text from a webpage may include "This is a list of art movements" with some additional surrounding text. Although such a snippet might convey relevancy of the webpage to the query, such a search result does not provide insight into the quality of the list, granularity of the list, the list size, contents of the list (e.g., sample entries), etc. For a user to obtain such information, the user is required to navigate to the webpage to view the list. As such, a user initially viewing search results is not provided with sufficient list information to easily decide which search result to select to view desired content, which may result in a higher number of unsatisfied clicks and a suboptimal user experience.

SUMMARY

Embodiments of the present invention relate to systems and methods that provide list previews among search results. Utilizing the systems and methods described herein, a list preview that represents a list within a webpage associated with a search result is provided in association with the search result that relates to a search query. In some embodiments, attributes of a list preview or a list that characterize the list preview or list are displayed in association with the list preview. Displaying such a list preview and/or an attribute(s) associated therewith among search results on a search results page enables a user to more readily understand or recognize contents of a list contained within a webpage corresponding with a search result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate presenting list previews in association with search results. A list, as used herein, refers to any collection of items grouped together. A list may be referred to as a list, a collection of items, a set of items, a table, etc. A list preview, as used herein, refers to a preview, representation, or sampling of a list associated with a search result. In embodiments, a list preview is a portion of a list that represents, describes, summarizes, reflects, characterizes, or otherwise portrays a list associated with a search result. A list preview might include any number of items from a list associated with a search result. For example, assume a list within a webpage that corresponds with a search result includes ten items. A list preview might include a portion of the ten items, such as five items. Alternatively, a list preview might include each of the items within the list (i.e., ten items). Such a list preview can provide a user with a brief overview of the list or webpage associated therewith. As such, a user can identify whether the particular list or webpage content is of interest to the user.

A search results page, as used herein, refers to a list of search results that correspond with a query, or a portion thereof. In this regard, a search results page lists relevant search results returned by a search engine in response to a query. A search result refers to a listing of a webpage associated with content related to a query. A search result might include features such as a title that identifies a webpage, a link to the webpage, a text summary that summarizes or describes at least a portion of the content of a webpage (i.e., a snippet), or the like.

In some instances, although a user is generally presented with search results that each includes a text summary summarizing content of a webpage, the user may desire to be presented with a list preview associated with the webpage. That is, a user may wish to view a list preview associated with a list contained within a webpage. The presentation of a list preview may be desired, for example, so that a user can recognize a list or webpage and determine whether to navigate to view that particular list and/or webpage; so that a user can generally recognize content of a webpage or list and determine whether to navigate to the webpage; so that a user can quickly view at least a portion of a list without navigating to the corresponding webpage; or the like.

Accordingly, in embodiments of the present invention, a search result might also include or corresponds with a list preview that provides a preview of a list within the webpage associated with the search result. Alternatively or additionally, a list preview indicator that provides an indication of a list preview might be associated with a search result. Such a list preview and/or a list preview indicator might be positioned near or adjacent to the title, link, and/or text summary that correspond with the search result. In such a case, a list preview indicator may be selected or hovered over to view the list preview.

In various embodiments, a user may view a list preview and, thereafter, continue perusing search results. That is, a user might be presented with a list preview within a search results page to obtain a summary of a list within a webpage while maintaining a view of other search results returned in response to a query. As such, the user can attain an understanding of webpage content or a list associated with the webpage without navigating away from the search results page. Accordingly, if the list preview is unsatisfactory or uninteresting to a user, the user can simply view other search result listings (e.g., search results containing a list preview and/or search results without a list preview) without having to navigate or link to a particular webpage associated therewith, and thereafter return to the initial search results page.

By way of example only, assume a user enters a query to locate a listing of information pertaining to a specific topic. Further assume that the user is presented with a search results page that contains a plurality of search results, wherein some of the search results include a list preview while other search results do not include a list preview. For the search result listings that have a list preview, the user can view the list preview while remaining within the search results page or select to view a list preview, via a list preview indicator, while remaining within the search results page. Such a list preview can offer a user a summary of a list or a webpage associated therewith. A list preview can oftentimes provide a user with more information or more readily identifiable information than can be obtained by a typical text summary or description.

Figure 1:
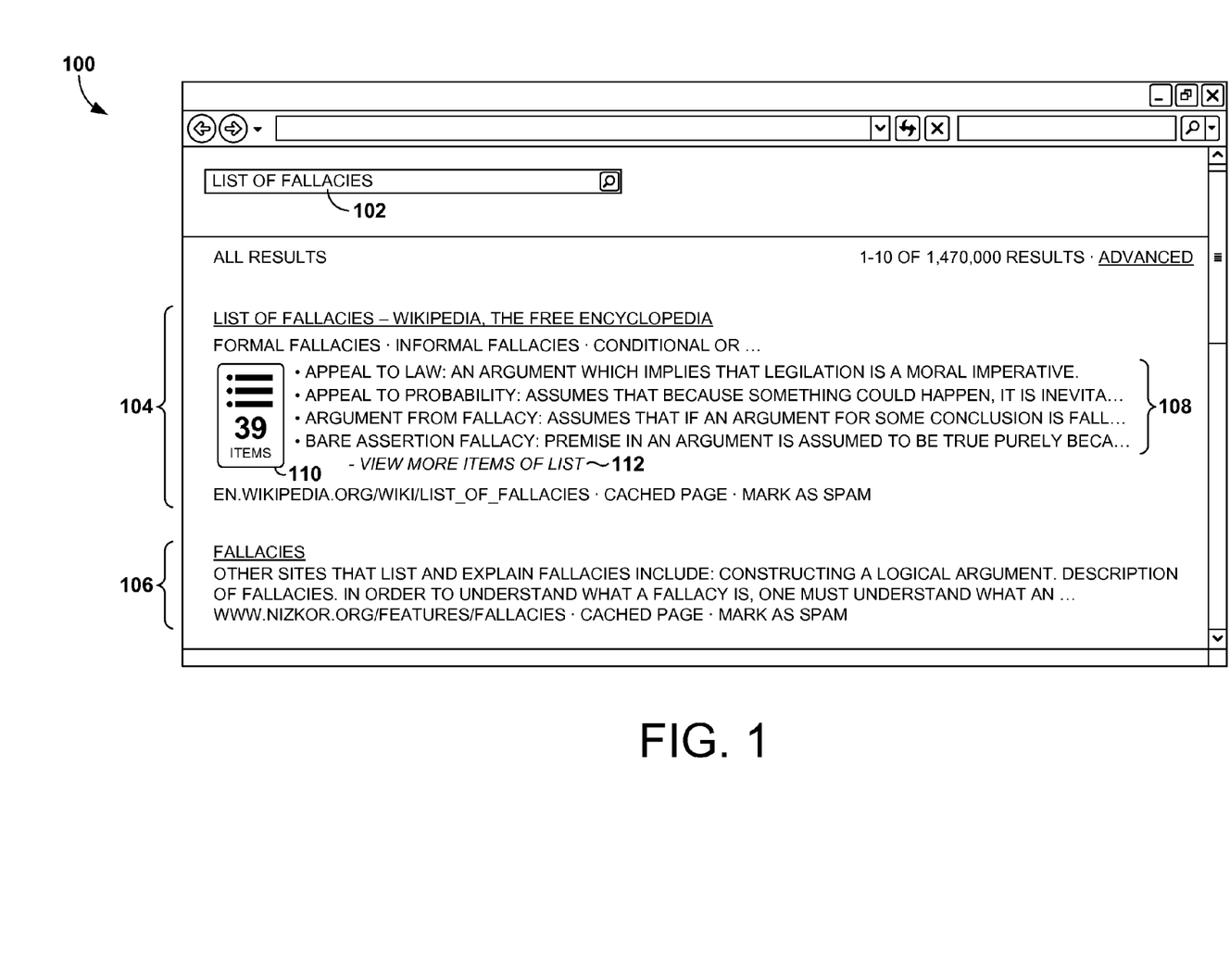
FIG. 1 is an illustrative screen display of an exemplary user interface illustrating a list preview within a search results page, in accordance with an embodiment of the present invention.

For instance, with reference to FIG. 1, a search results page, generally depicted by reference numeral 100, is shown, in accordance with an embodiment of the present invention. The search results page 100 is provided in response to a user search query 102. The search results page 100 includes search result listing 104 and search result listing 106. Search result listing 104 includes a list preview 108, while search result listing 106 does not include a list preview.

Figure 2:
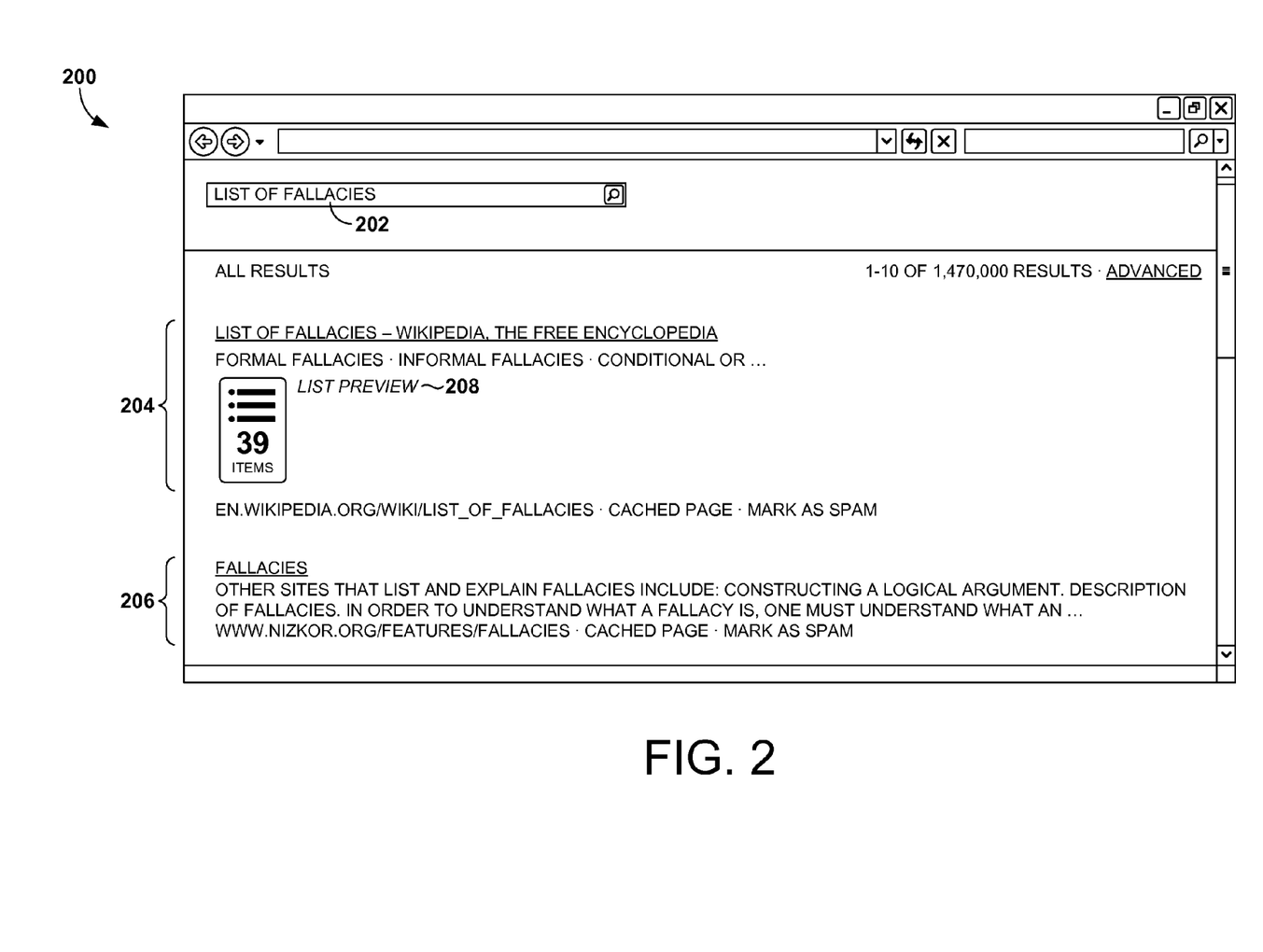
FIG. 2 is an illustrative screen display of an exemplary user interface illustrating a list preview indicator within a search results page, in accordance with an embodiment of the present invention.

By way of further example, with reference to FIG. 2, a search results page, generally depicted by reference numeral 200, is shown, in accordance with an embodiment of the present invention. The search results page 200 is provided in response to a user search query 202. The search results page 200 includes search result listing 204 and search result listing 206. Search result listing 204 includes a list preview indicator 208, while search result listing 206 does not include a list preview or list preview indicator.

A user can select or hover over the list preview indicator 208 to be presented with the list preview. Upon such a selection, the list preview is presented to the user within the context of search results page 200. That is, the user is not required to navigate or link away from the search results page 200 to view the list preview. For example, such a list preview might be presented at or near the location of the list preview indicator 208. As such, while the list preview is being presented or upon presentation of the list preview, the user can view details regarding a list associated with a search result without being required to navigate to a particular web page and thereafter return to the initial search results page 200.

Accordingly, in one aspect, one or more computer storage media having computer-executable instructions embodied thereon for performing a method that provides list previews among search results are provided. The method includes referencing a user query that indicates a user intent to view a list. In response to the user query, presenting at least one search result within a set of search results that includes a list preview comprising at least a portion of a list within a webpage associated with the search result.

In another aspect, a computerized method that provides list previews among search results is provided. The computerized method includes receiving a user query that indicates a user intent to view a list. A list contained within a webpage associated with a search result relevant to the user query is identified. A set of items from the list contained within the webpage is selected. The selected set of items is then presented as a list preview in association with the search result relevant to the user query. The list preview provides a representation of the items included within the list contained within the webpage.

In yet another aspect, a graphical user interface embodied on one or more computer-readable media and executable on a computer is provided. The graphical user interface includes a first display area configured for displaying a search result presented on a search results page in response to a search query. The search result is associated with a webpage having a list of items. The graphical user interface also includes a second display area positioned near the first display area on the search results page. The second display area is configured for displaying a list preview that includes at least a portion of the items of the list within the webpage.

Having briefly described an overview of the present invention, an exemplary operating environment in which various aspects of the present invention may be implemented is described below in order to provide a general context for various aspects of the present invention. Referring to the drawings in general, and initially to FIG. 3 in particular, an exemplary operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 3:
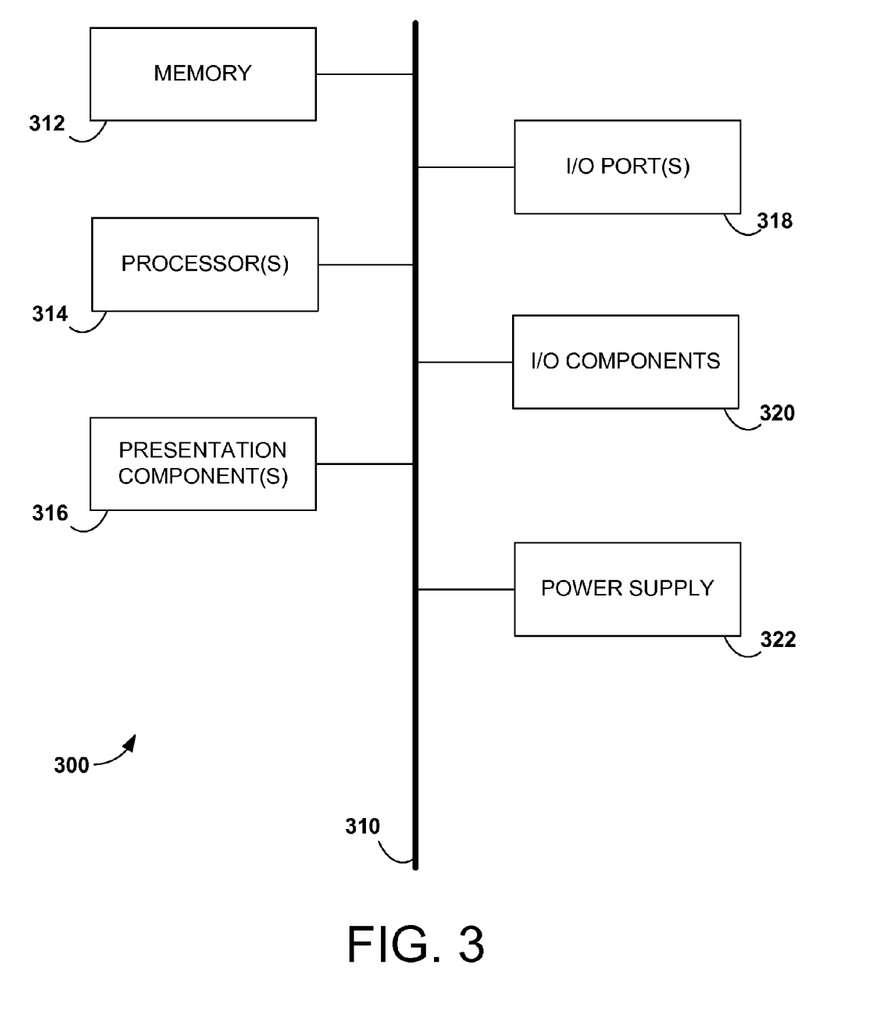
FIG. 3 is a block diagram of an exemplary computing environment suitable for use in implementing embodiments of the present invention.

With reference to FIG. 3, computing device 300 includes a bus 310 that directly or indirectly couples the following devices: memory 312, one or more processors 314, one or more presentation components 316, input/output ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer-storage media in the form of volatile and/or nonvolatile memory. The memory may be removable, nonremovable, or a combination thereof. Exemplary hardware devices include solid-state memory, hard drives, optical-disc drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc.

Figure 4:
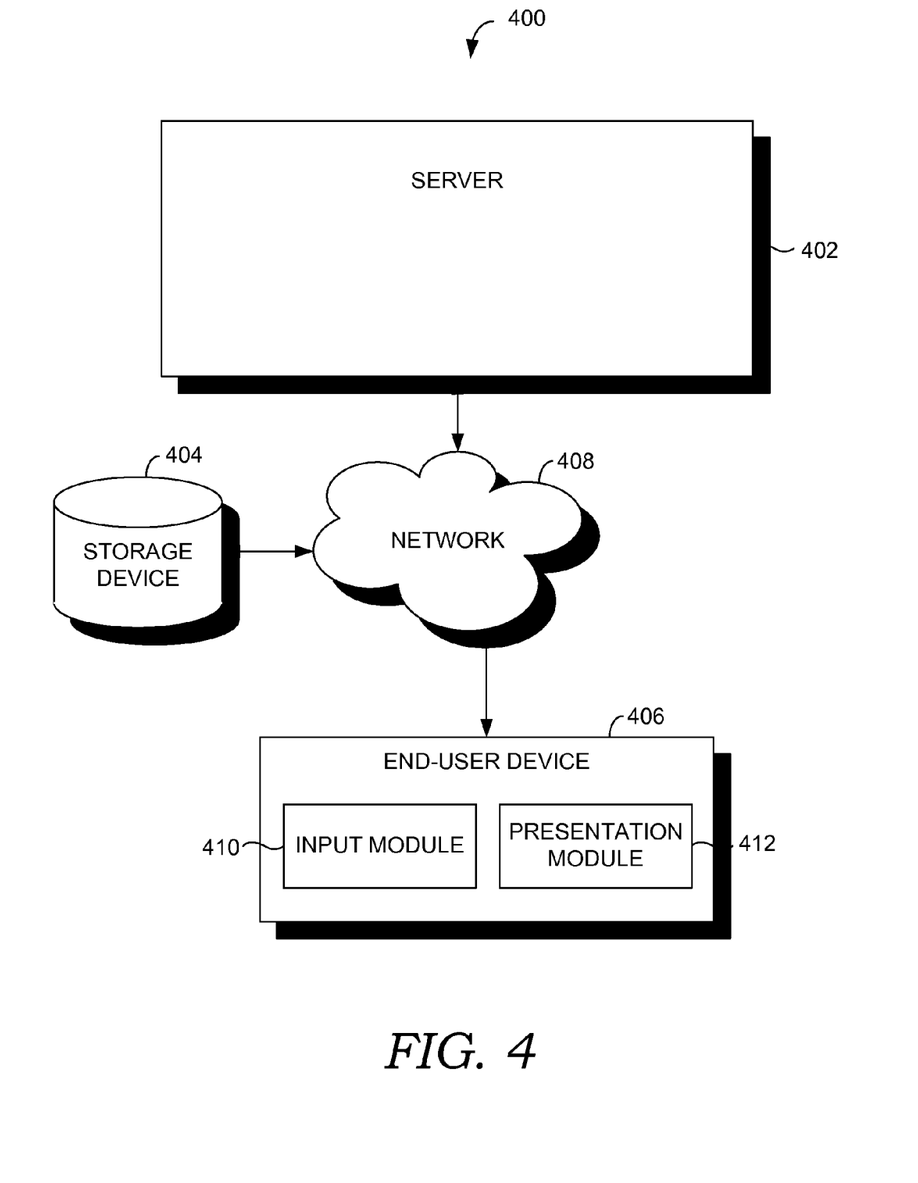
FIG. 4 is a block diagram of an exemplary computing system architecture suitable for use in implementing embodiments of the present invention.

With reference to FIG. 4, a block diagram is illustrated that shows an exemplary computing system architecture 400 configured for use in implementing embodiments of the present invention. It will be understood and appreciated by those of ordinary skill in the art that the computing system architecture 400 shown in FIG. 4 is merely an example of one suitable computing system and is not intended to suggest any limitation as to the scope of use or functionality of the present invention. Neither should the computing system architecture 400 be interpreted as having any dependency or requirement related to any single module/component or combination of modules/components illustrated therein.

Computing system architecture 400 includes a server 402, a storage device 404, and an end-user device 406, all in communication with one another via a network 408. The network 408 may include, without limitation, one or more local area networks (LANs) and/or wide area networks (WANs). Such networking environments are commonplace in offices, enterprise-wide computer networks, intranets and the Internet. Accordingly, the network 408 is not further described herein.

The storage device 404 is configured to store information associated with search results, list previews, or the like. In various embodiments, such information may include, without limitation, domains, URLs, webpages, websites, lists, information associated therewith, and the like. In embodiments, the storage device 404 is configured to be searchable for one or more of the items stored in association therewith. It will be understood and appreciated by those of ordinary skill in the art that the information stored in association with the storage device 404 may be configurable and may include any information relevant to search results, list previews, or the like. The content and volume of such information are not intended to limit the scope of embodiments of the present invention in any way. Further, though illustrated as a single, independent component, the storage device 404 may, in fact, be a plurality of storage devices, for instance a database cluster, portions of which may reside on the server 402, the end-user device 406, another external computing device (not shown), and/or any combination thereof.

Each of the server 402 and the end-user device 406 shown in FIG. 4 may be any type of computing device, such as, for example, computing device 300 described above with reference to FIG. 3. By way of example only and not limitation, each of the server 402 and the end-user device 406 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 402 may include any type of application server, database server, or file server configurable to perform the methods described herein. In addition, the server 402 may be a dedicated or shared server. One example, without limitation, of a server that is configurable to operate as the server 402 is a structured query language ("SQL") server executing server software such as SQL Server 2005, which was developed by the Microsoft® Corporation headquartered in Redmond, Wash.

Components of server 402 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 408. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 400 is merely exemplary. While the server 402 is illustrated as a single unit, one skilled in the art will appreciate that the server 402 is scalable. For example, the server 402 may in actuality include a plurality of servers in communication with one another. Moreover, the storage device 404 may be included within the server 402 or end-user device 406 as a computer-storage medium. The single unit depictions are meant for clarity, not to limit the scope of embodiments in any form.

As shown in FIG. 4, the end-user device 406 includes a user input module 410 and a presentation module 412. In some embodiments, one or both of the modules 410 and 412 may be implemented as stand-alone applications. In other embodiments, one or both of the modules 410 and 412 may be integrated directly into the operating system of the end-user device 406. It will be understood by those of ordinary skill in the art that the modules 410 and 412 illustrated in FIG. 4 are exemplary in nature and in number and should not be construed as limiting. Any number of modules may be employed to achieve the desired functionality within the scope of embodiments hereof.

The user input module 410 is configured, for example, for receiving input of one or more queries. Typically, a query is input via a user interface (not shown) associated with the end-user device 406, or the like. Upon receiving input of query terms, the presentation module 412 of the end-user device 406 is configured for presenting search results. In one embodiment, the presentation module 412 presents a plurality of search results utilizing a display device associated with the end-user device 406. Embodiments, however, are not intended to be limited to visual display but rather may also include audio presentation, combined audio/video presentation, and the like.

Figure 5:
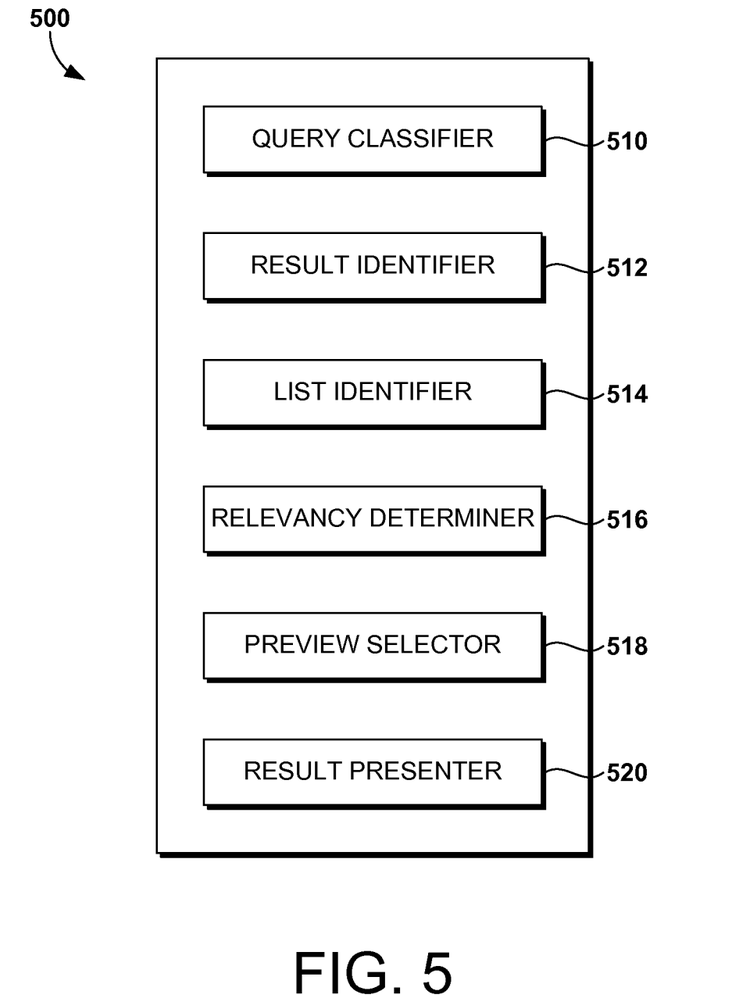
FIG. 5 is a block diagram of an exemplary computer system for use in implementing embodiments of the present invention.

FIG. 5 illustrates an exemplary computing system 500 for providing list previews, or indications thereof, in association with search results. As shown in FIG. 5, an exemplary computing system 500 includes a query classifier 510, a result identifier 512, a list identifier 514, a relevancy determiner 516, a preview selector 518, and a result presenter 520. In some embodiments, one or more of the illustrated components may be implemented as stand-alone applications. In other embodiments, one or more of the illustrated components may be integrated directly into the operating system of the server 402, a cluster of servers (not shown) and/or the end-user device 406. It will be understood by those of ordinary skill in the art that the components illustrated in FIG. 5 are exemplary in nature and in number and should not be construed as limiting. Any number of components may be employed to achieve the desired functionality within the scope of embodiments hereof. Further, components may be located on any number of servers or computing devices. By way of example only, result identifier 512 may reside on a cluster of servers. In such a case, the identified search results may be sent to yet another server networked to an end user.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The query classifier 510 is configured for referencing queries, or portions thereof, i.e., a request for information that may pertain to one or more search terms. A query may be referenced as a user inputs search terms or upon a user inputting one or more terms and, thereafter, selecting a search tool to submit the query, such as an icon, "search" button, or the like. Alternatively, a query may be referenced upon a user selecting text (e.g., hyperlink or other selectable text) presented on a display associated with the end-user device 406. For example, selectable text may be displayed within a webpage, a menu, a drop-down box, a table of contents, a list, or an index on a website.

The query classifier 510 might receive, retrieve, reference, or intercept a query, or a portion thereof. In one embodiment, a query is a user search query. A user search query might be entered by a user into a search engine via a search engine webpage. Such a search engine might be any information retrieval system used to locate information within a computer system (e.g., the World Wide Web or other computer system) and provide search results. As such, in one embodiment, a search engine might be a web search engine that searches the World Wide Web generally based on a user's search query. Such a web search engine may provide search results related to any variety of products, services, information, data, or other information available on the World Wide Web. In this regard, a web search engine provides search results via a search engine webpage that are based generally on the user search query.

By way of example only, based on a user search query input into a general search website (e.g., Microsoft's Bing.com), a general search engine (Microsoft® Bing™ Search) searches for and provides general search results related to the search query. That is, the search engine results may include search results that are not associated with a list preview (i.e., a non-list search result) and/or search results that are associated with a list preview (i.e., a list search result). A list search result refers to a search result corresponding with a list preview. A non-list search result refers to a search result that does not correspond with a list preview, such as a search result associated with a webpage having information where no list or list preview is available or presented in association therewith.

A user can interact with a search engine in any variety of ways. A user might interact with a search engine in a webpage format. That is, a search engine webpage might be utilized to enter a search query and provide search results. Exemplary search engine and corresponding webpages include, but are not limited to, Microsoft® Bing™ Search accessible via Microsoft's Bing.com and MSN.com web portal, Google™ search accessible through Google's google.com web portal, and Yahoo!® search accessible through Yahoo's yahoo.com web portal. Alternatively, a user might interact with a search engine in a toolbar format in which a search query entry field is placed on a user's web browser for easier access to the search engine.

The query classifier 510 is also configured to classify or designate a query as to user intent. In this regard, the query classifier 510 analyzes a query to determine user intent, that is, whether the user likely intends or desires to view a list (i.e., contents of a list). In embodiments, to determine or classify query intent associated with a user's desire to view a list, terms used and/or sequence of terms may be analyzed to determine query list intent (i.e., intent to view a list as indicated in a query). For example, a query using the term "list" or the phrase "list of" might be recognized as a user intent to view a list preview.

In some embodiments, a machine-learned model may be utilized to determine query list intent. By way of example only, an n-gram regression model may be generated in association with positive and negative samples and features associated therewith. Thereafter, the regression model can be used to compute a score for a particular query. A determination as to query list intent can be determined in accordance with the score. For example, if a score exceeds a threshold, it may be determined that a user wishes to view a list or does not wish to view a list.

The result identifier 512 is configured for identifying search results. The search results identified may include all relevant search results or a specific portion, e.g., number or percent, of relevant search results. For example, in an embodiment where a specific portion of relevant search results are identified, upon receiving a user query, five million documents may be searched and 15,000 documents may be relevant to the user query. In such a case, although 15,000 relevant search results exist, only the 10,000 most relevant search results may be identified to be presented in response to the user's query.

In one embodiment, the result identifier 512 identifies search results by either receiving, retrieving, referencing, or intercepting search results provided by another server, cluster of servers, user device, or any combination thereof (e.g., a search engine). In some cases, result identifier 512 may perform search result modifications upon receiving or retrieving relevant search results. For example, the result identifier 512 may restrict the total number of search results obtained, rank the search results, or the like.

Alternatively, result identifier 512 identifies desired search results by determining the search results. In such an embodiment, result identifier 512 searches for and identifies search results. In one embodiment, relevant information may be identified by searching documents, indices, or a combination thereof. The search results identified by result identifier 512 may include all relevant search results or a specific number or percentage of relevant search results. In some embodiments, result identifier 512 may further be configured to organize or restrict search results. For example, search results might be organized by a document ranking based, in part, on the relevance of the document to the query. In addition or in the alternative, the total number of search results might be restricted or limited. In embodiments, a portion of the search results identified for a particular query might include a list preview, or an indication thereof, while a portion of the search results identified might exclude a list preview (e.g., a list preview is not available or is not desired).

The list identifier 514 is configured to identify lists within webpages associated with search results. In this regard, a webpage that is identified as a search result for a particular query is analyzed to identify one or more lists within the webpage. As can be appreciated, in some embodiments, the list identifier 514 may additionally or alternatively identify lists within the body of the webpage (i.e., the main content area of the webpage). In alternative embodiments, the list identifier 514 may identify lists within other portions of the webpage, such as the navigation portion of the webpage. In some cases, such lists identified by list identifier 514 are extracted or otherwise accessed for further analysis, as described in more detail below.

Any method can be utilized to identify lists within webpages. For example, data known to be generally utilized with lists or used in relation to lists can be recognized to identify lists. In this regard, tags or other data associated with webpage content can be analyzed to determine whether such tags or data indicate a list. Tags may indicate, for example, particular formatting (e.g., bullets, etc.). For instance, HTML tags may be used to indicate or specify an ordered list (OL) (e.g., enumerated) or an unordered list (UL) (e.g., bulleted). Other data, such as terms or term sequences within webpages may be used to identify lists within webpages. By way of example, a title or heading of a list may use the phrase "list of" to indicate a list.

The list identifier 514 may identify lists within a portion of webpages associated with search results or each webpage associated with search results corresponding with a particular query. For example, list identifier 514 may identify lists within the webpages associated with the first page of search results, a first set of search results listed in a search results page, etc. As can be appreciated, in some embodiments, the list identifier 514 may identify lists within webpages associated with search results if it is determined that the user intends or desires to view a list(s), for example, as indicated by the query classifier 510. In this regard, in cases that the user has query list intent, one or more lists within at least a portion of webpages associated with search results for a particular query are identified.

The relevancy determiner 516 determines a particular list from a webpage associated with a search result that is most relevant. In one embodiment, a relevancy determiner 516 may identify a relevancy based on how relevant a list is relative to a user's query. In an alternative embodiment, a relevancy determiner 516 may determine relevancy based on how relevant a list is relative to contents of the webpage. In cases that a webpage includes multiple lists, the relevancy determiner 516 is used to determine or identify which of the lists is more relevant (e.g., to a user query or content of a webpage) and, thereby, more likely desired to be viewed by a user. As can be appreciated, in some cases, a particular webpage may only have a single list. In such a case, the relevancy determiner 516 may not be utilized to determine relevancy of the list or the relevancy determiner 516 may designate the single list as the most relevant list. Alternatively, such a single list may be analyzed to ensure a predetermined amount of relevance, for example, to a user query or to webpage content. For example, a relevancy score may be determined for a list and compared to a relevancy threshold to ensure that the list is relevant, at least to a predetermined extent.

The relevancy determiner 516 can determine or designate a particular list as the most relevant or as exceeding a predetermined level of relevance using any method. In one embodiment, the relevancy determiner 516 utilizes a machine-learned model. By way of example, a machine-learned model can be generated using extracted lists and features associated therewith. Such features might be, for example, a list proceeded by a header, whether a header has commonalities with a query, a length of a list, a length of terms within a list, an element(s) common to a navigational list (e.g., "about"), a particular word(s) from a database lookup, etc. Thereafter, the machine-learned model can be used to compute a relevancy score for a particular list. Upon comparing relevancy scores corresponding with lists within a webpage associated with a search result, a most relevant list can be determined.

The preview selector 518 is configured to select items from lists to include in list previews. In embodiments, the preview selector 518 may select items from lists that are indicated or designated as most relevant within webpages, for example, as determined by relevancy determiner 516. An item or a list item, as used herein, refers to any data provided within a list of items. Such an item may be a value, text (e.g., a word, a phrase, an acronym, a sentence), a symbol, or the like. In embodiments, an item or list item is related to the subject or topic of the list. For example, a list of fruits may include the items of "apple," "banana," "cantaloupe," etc.

Items selected for presentation in a list preview can be selected in any number of ways. In some cases, a first group of items set forth within a list may be selected for a preview. In other cases, a random group of items may be selected for a preview. In yet another case, a particular group of items identified based on an algorithm may be selected for a preview. As can be appreciated, any number of items may be selected. For example, a predetermined number, a random number, or a percentage or other determined number of items can be selected for presentation within a list preview. A number of items selected for a list preview may be based on, for example, an algorithm, a number of items or content of a list, a number of search results, a user preference, an administrator or developer preference, etc.

In some embodiments, the preview selector 518 also selects or determines attributes associated with a list preview or the list. A list attribute, as used herein, refers to any characteristic of a list. Similarly, a list preview attribute refers to any characteristic of a list preview. By way of example only, a list preview attribute and/or a list attribute may be a number of items within a list or list preview, a relevancy score associated with a list or list preview, etc. Such list attributes and/or list preview attributes can be presented to a user to provide additional data regarding the list or list preview. For example, and with reference to FIG. 1, a list attribute 110 is displayed along with a list preview 108. The list attribute 110 provides an indication of a number of items contained within the list corresponding with the search result 104.

The result presenter 520 is configured to present list previews or indications thereof (i.e., list preview indicators). In one embodiment, list previews or indications thereof are presented by displaying such data in association with corresponding search results to a user via a user interface. In another embodiment, list previews or list preview indicators are presented by communicating such data to another computing device. For example, such data may be communicated to a search engine such that the search engine can incorporate the data into the search results page to be transmitted to the user device. By way of further example, such data may be communicated to the user device for display to the user, via a display screen of the user device.

As can be appreciated, notwithstanding whether the result presenter 520 aggregates the list preview with search results or another component, such as a search engine, aggregates the list preview with search results, the list preview can be presented in association with a search result in any manner. For example, in one embodiment, the list preview may be added as a portion of the snippet of the search result. In another embodiment, a list preview may be presented near or adjacent to a search result, or a portion thereof. For instance, a list preview may be presented just below a snippet or to the left or right of a snippet or search result.

In embodiments, the result presenter 520 presents one or more list previews or list preview indicators via a computing device, such as the end-user device 406 of FIG. 4. Such list previews or list preview indicators may be presented in accordance with the items selected by the preview selector 518. In one embodiment, upon determining, identifying, or selecting one or more list previews to present, a list preview (s) or list preview indicator(s) may be displayed within a search results page. As previously mentioned, such a list preview(s) or list preview indicator(s) can be displayed in any location on a search results page, for example, near or adjacent to a corresponding search result, integrated with a corresponding search result (e.g., positioned near a related search result), the top portion of the results, near a side portion of the results, etc.

In cases where a list preview is presented along with a search result, the presentation thereof can begin at anytime, such as, for example, upon presenting the search results. As such, upon returning search results to a user, any list previews provided therewith might be presented. In cases where a list preview indicator is presented along with a search result, a user may select (e.g., click on, hover over, right click, etc.) a list preview indicator to view the list preview. A list preview indicator might be a still image or other icon (e.g., a button) that indicates or represents a list preview. Upon a user selecting a list preview indicator, the list preview can be presented to the user. In one embodiment, the list preview is presented without navigating away from the listing of search results (i.e., within the context of the search results page).

In some embodiments, a more indicator may be presented along with a list preview to indicate that additional list items can be provided upon selection of the more indicator. In this regard, upon selecting a more indicator, a portion of the remaining list items or all of the remaining list items (i.e., list items not initially displayed) may be presented. By way of example only and with reference to FIG. 1, a more indicator 112 is presented near the list preview 108 to indicate that more items associated with the list may be viewed, if selected.

Figure 6:
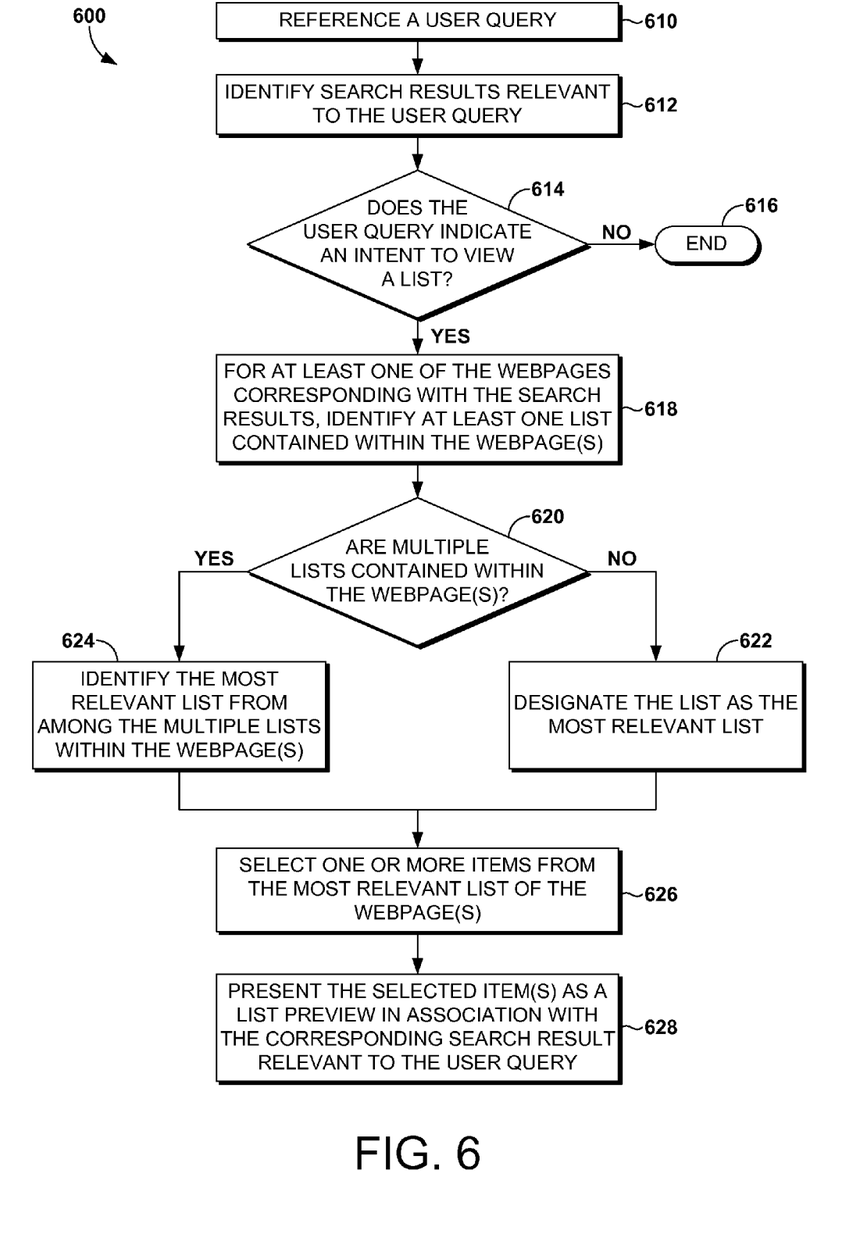
FIG. 6 is a flow diagram showing a method for providing list previews within a search results page, in accordance with an embodiment of the present invention.

Turning now to FIG. 6, a flow diagram is illustrated which shows a method 600 for providing list previews among search results, in accordance with an embodiment of the present invention. Initially, at block 610, a user query is referenced. Such a user query may be received based on a query entered and submitted by a user. Subsequently, at block 612, search results that are relevant to the user query are identified. In embodiments, a search engine may perform a search to identify relevant search results. At block 614, it is determined whether the user query indicates a user intent to view a list (i.e., contents of a list). If it is determined that the user does not intend to view a list, the method ends at block 616. On the other hand, if it is determined that the user does intend to view a list, for at least one of the webpages corresponding with the search results, at least one list contained within the webpage(s) is identified. This is indicated at block 618.

It is determined at block 620 whether multiple lists are contained within the webpage(s). If it is determined that only a single list is contained within the webpage(s), the list is designated as the most relevant list, as indicated at block 622. As can be appreciated, the list may not be designated as the most relevant list but still be used for a list preview or, alternatively, the list may be analyzed to verify that the list has a minimum level of relevancy, for example, to the user query or the contents of the webpage. If, however, it is determined that multiple lists are contained within the webpage(s), the most relevant list is identified from among the multiple lists within the webpage(s). This is indicated at block 624.

At block 626, one or more items from the most relevant list of the webpage(s) is selected. Such a selected item(s) is presented as a list preview in association with the corresponding search result relevant to the user query, as indicated at block 628. Accordingly, the list preview provides a summary of the items contained within the most relevant list of the webpage(s). In embodiments, the list preview is displayed integrated with or near the corresponding search result.

It will be understood by those of ordinary skill in the art that the order of steps shown in the method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A system comprising a memory comprising instructions for execution by one or more processors, the one or more processors being coupled to the memory and operable to execute the instructions to:
    identify by a query classifier that a user query comprises a query list intent, wherein the query list intent indicates an intent to view one or more webpages including at least one list, wherein the at least one list is at least a portion of at least one of the one or more webpages that includes one or more of a list, a collection of items, a set of items, or a table;
    identify by a result identifier a plurality of search results that are relevant to the user query, wherein the plurality of search results comprises the one or more webpages including the at least one list and one or more webpages that do not include the at least one list;
    identify by a list identifier and a relevancy determiner a first list exceeding a predetermined level of relevance from within each of the one or more webpages including the at least one list;
    select by a preview selector one or more items from the first list exceeding the predetermined level of relevance to include in a list preview within a search results page, where the list preview is associated with the first list exceeding the predetermined level of relevance and is provided for each of the one or more webpages including the at least one list;
    select by the preview selector one or more list attributes corresponding to the list preview, wherein the one or more list attributes identifies, for the list preview, a total number of items within the first list exceeding the predetermined level of relevance associated with the list preview; and
    provide by a result presenter on the search results page each of (1) the one or more webpages including the at least one list, (2) the one or more webpages that do not include the at least one list, (3) the list preview that is automatically provided in the search results page for each of the one or more webpages including the at least one list, and (4) the one or more list attributes corresponding to the first list exceeding the predetermined level of relevance.

2. The system of claim 1, wherein the at least one list comprises a collection of items related to a particular subject matter.

3. The system of claim 1, wherein one or more terms of the user query, a sequence of the one or more terms of the user query, or a combination thereof is utilized to determine the query list intent is present.

4. The system of claim 1, wherein the preview selector selects the one or more items from the first list exceeding the predetermined level of relevance by analyzing each of the one or more webpages associated with the first list exceeding the predetermined level of relevance.

5. The system of claim 4, further comprising a relevancy determiner for determining which of the one or more items of the the first list exceeding the predetermined level of relevance within the one or more webpages is most relevant among the one or more items.

6. The system of claim 5, wherein the relevancy determiner bases a relevancy of the one or more items on a relevance to the user query or a relevance to webpage content.

7. A computerized method that provides list previews among search results, the method comprising:
    receiving a user query comprising a query list intent, wherein the query list intent indicates an intent to view one or more webpages that include at least one list, wherein the at least one list is a portion of at least one of the one or more webpages and includes a list, a collection of items, a set of items, or a table;
    identifying a first list contained within a first webpage of the one or more webpages corresponding with a first search result of a plurality of search results relevant to the user query, wherein the first list is identified as exceeding a predetermined level of relevance;
    selecting a set of items from the first list contained within the first webpage; and
    providing, for presentation within a search results page, (1) the plurality of search results, (2) the first search result associated with the first webpage and including the first list exceeding the predetermined level of relevance, (3) a list preview including the set of items from the first list, and (4) at least one list attribute associated with the first list, the at least one list attribute indicating at least one of a number of items within the first list of the first webpage, a relevancy score associated with the first list, or a quality score associated with the first list.

8. The computerized method of claim 7, further comprising identifying the plurality of search results relevant to the user query.

9. The computerized method of claim 7, further comprising determining a second list of a plurality of lists within a second webpage, wherein the second list exceeds the predetermined level of relevance to the user query or to content of the second webpage.

10. The computerized method of claim 7, further comprising determining one or more list preview attributes that provide details regarding the list preview.

11. The computerized method of claim 10, further comprising presenting the one or more list preview attributes in association with the list preview.

12. The computerized method of claim 7, wherein the set of items is provided within the list preview and is integrated with the first search result or near the first search result.

13. One or more computer storage hardware devices having instructions embodied thereon that, when executed by on a computer, cause the computer to provide a graphical user interface, the graphical user interface comprising:
a first display area configured for displaying a first search result of a plurality of search results presented on a search results page in response to a search query, the first search result being associated with a first webpage including a first list of a plurality of lists within content of the first webpage, wherein the first list is at least a portion of the first webpage provided in a form of a list, a collection of items, a set of items, or a table, and wherein the first list is determined to exceed a predetermined level of relevance;
a second display area positioned near the first display area on the search results page, the second display area configured for displaying a list preview that includes at least a portion of a set of items of the first list within the first webpage of the first search result; and
a third display area configured for displaying one or more list attributes that provide a characteristic of the first list of the first webpage, wherein the one or more list attributes comprise at least one of a number of items within the first list, a relevancy score associated with the first list, or a quality score associated with the first list.

14. The computer storage hardware devices of claim 13, further comprising a fourth display area configured for displaying one or more list preview attributes that provides a characteristic of the list preview.

15. The computer storage hardware devices of claim 13, further comprising a fourth display area configured for displaying a more indicator that, if selected, results in presentation of additional items from the set of items not included within the list preview.

16. The computer storage hardware devices of claim 13, wherein the second display area is integrated with the first display area.

* * * * *